M. LACHMAN.
METAL WHEEL AND METHOD OF MAKING SAME.
APPLICATION FILED APR. 8, 1920.
1,424,490. Patented Aug. 1, 1922.
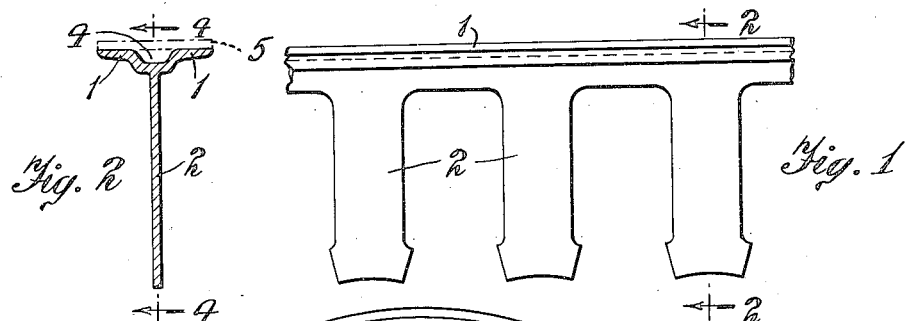
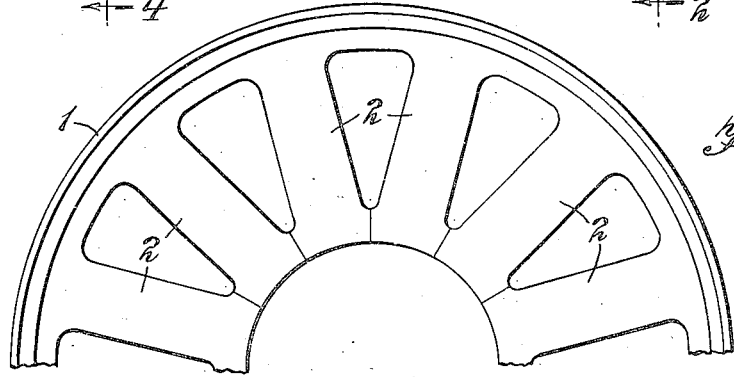
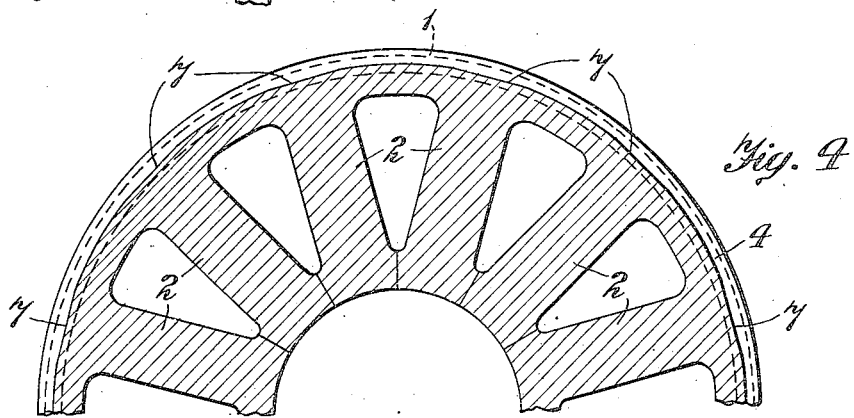
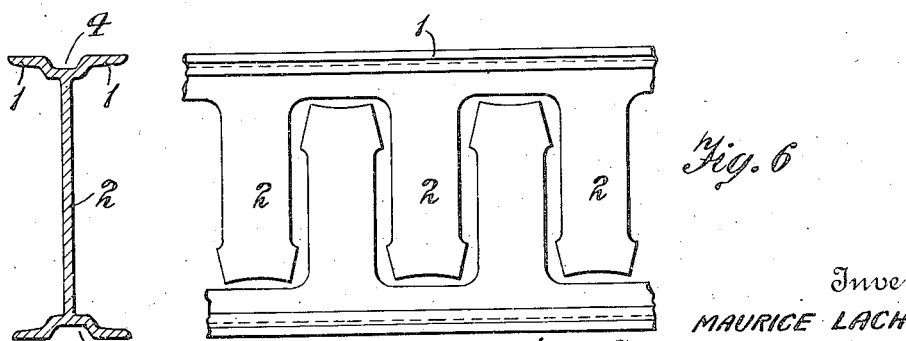
Inventor
MAURICE LACHMAN
By his Attorneys
Townsend & Decker

UNITED STATES PATENT OFFICE.

MAURICE LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METAL WHEEL AND METHOD OF MAKING SAME.

1,424,490.      Specification of Letters Patent.      Patented Aug. 1, 1922.

Application filed April 8, 1920. Serial No. 372,134.

*To all whom it may concern:*

Be it known that I, MAURICE LACHMAN, a citizen of the United States, and a resident of New York, in the county of New York and State of New York, have invented certain new and useful Improvements in Metal Wheels and Methods of Making Same, of which the following is a specification.

My invention relates to metal wheels of the type in which the rim and the spokes or body part are integral with one another and more particularly to wheels of this type wherein the rim consists of the head and the spokes or body consist of the web of a rolled metal bar of T or I form in cross-section.

In constructing wheels of this form it has been proposed to cut out portions of the web and then to bend or roll the rim into a circle to form the rim, the portions of web unremoved being by this operation brought into the proper relation to form the spokes or body of the wheel, the inner ends of the spokes being assembled at the hub. In constructing a wheel in this manner the bending of the head into a circle is opposed by the heavy body of metal on edge which constitutes the spokes or equivalent part of the wheel so that there is a tendency to the formation of flats and bulges in the head and difficulty is encountered in forming the head or rim into a true circle especially if spokes of material width at the rim are desired.

The aim of my invention is to avoid these objections to which end my invention consists preferably in providing the rolled metal bar, from which the wheel is constructed, with a longitudinal groove or depression over the web and between the arms of the head whereby the head may be deformed or bent to a true circle or arc of a circle without bending or deforming the web or parts of web retained for the spoke or body part of the wheel.

In the accompanying drawings:

Fig. 1 is a side elevation of a portion of a rolled metal T bar suitably prepared for use in carrying out my invention.

Fig. 2 is a cross-section of the same on the line 2—2 of Fig. 1.

Fig. 3 shows in side elevation the bar bent or rolled to form the rim and body of the wheel, a portion only of the wheel being shown.

Fig. 4 is a cross-section through the center of the wheel and taken in a plane indicated by the line 4—4 Fig. 2.

Fig. 5 shows in cross-section an I bar similarly prepared for use in carrying out my invention.

Fig. 6 is a side elevation of the same with its web divided into spoke parts.

Referring to Figs. 1 to 4, 1 indicates the head of a rolled metal bar of T shape in cross-section and of suitable length for forming a wheel or section of wheel of the desired diameter and 2 the web of the bar. In Fig. 1 the web is shown as divided or cut out to form spokes or spoke portions suitable for a wheel such as shown in Fig. 3. The number of spokes, the extent of spaces between spokes or the extent to which in the finished wheel the space between rim and hub is filled out by metal formed from the web of the bar is a matter of choice and will obviously determine the manner of cutting out or slitting the web preparatory to the operation of forming or bending the head to the circumference of the rim.

Between the arms or flanges of the head or, as otherwise described over the web of the bar as prepared for bending, a depression or groove 4 is provided which may be made in the operation of rolling the bar or otherwise. The effect of this is that the two arms or flanges constituting the head may be bent to the circle of the wheel rim without substantial opposition from or disturbance to the form of the body of the web and as shown in the cross-section Fig. 4 wherein, as will be seen, the said arms or flanges approach nearer to the bottom of the groove 4 at some places than at others and therefore the bending or deforming of the head flanges into a true circular rim may be accomplished without substantially deforming the body of the web. The flat places in the bottom of the groove 4 due to the difficulty of bending the web on edge into an arc of a circle are indicated at 7. The depression or groove 4 obviously should be as narrow as possible consistently with the object to be attained so that there will be little interruption in the surface of the rim after formation or bending of the head.

The usual tire or other rim indicated in dotted lines 5 in Fig. 2 will however conceal any depression due to the groove 4 in the finished wheel.

Obviously, the rolling or bending of the head to the circular form may be done in a manner to enlarge the diameter and thus overcome the difficulty of the flat places in the rim due to the mass of metal of the web on edge. In this case the groove 4 instead of being formed when rolling the bar is formed when or after bending or rolling the head into circular form to form the rim, the flanges 1 being expanded or offset to such extent that their periphery is of larger diameter than the diameter of any part of the groove.

In rolling or bending the head to the circle of the rim the unremoved portions of the web are caused to converge into the spoke or body element and assembled in their proper relation to the hub part. The hub ends of the spokes may be secured to the hub in any desired manner or relation.

In Fig. 5 a rolled bar of I section with depressions in its two heads is shown. As indicated in Fig. 6, the web may be divided to form two T beams or bars each having integral spokes and head. Each of these bars may be used in the construction of a wheel as previously described.

It will be understood that the hub ends of the spokes may be assembled in any desired manner in any suitable hub structure.

What I claim as my invention is:—

1. The herein described method of constructing a metal wheel with rim and spoke or body part integral, consisting in providing a T beam having a depression in its head over the web part, dividing the web, and forming the head into circular shape to form the rim and bring the parts of the web into proper relation for the body or spoke part.

2. The method of constructing a metal wheel with rim and spokes integral, consisting in providing a T beam having a groove in its head in line with the web, dividing the web to form spokes and bending or rolling the head into circular shape to form the rim and assemble the spokes at the hub.

3. The method of constructing a metal wheel from a T bar having integral head and web consisting in dividing the web to form spokes, bending or rolling the head to form a circular rim and bring the spokes into proper relation at the hub and offsetting the head or rim flanges to a larger diameter than the diameter at the juncture of head and web.

4. A metal wheel constructed of an integral T beam, the head forming the circular rim member and the web divided to form the spoke member and a groove or depression in the rim in line with the web and containing any flats or bulges resulting from the forming operation.

5. A metal wheel constructed of an integral T beam the head of which is bent to the true circle of the rim while the spoke members consist of subdivisions of the web and having a groove or depression in line with the web and between the arms of the head for flats or bulges due to the bending operation.

Signed at New York in the county of New York and State of New York this 2d day of December, A. D. 1919.

MAURICE LACHMAN.

Witnesses:
GEORGE E. BROWN,
F. B. TOWNSEND.